Feb. 12, 1935.  E. L. ROLFS ET AL  1,990,711

PIPE WRAPPING APPARATUS

Filed April 4, 1929  9 Sheets-Sheet 1

INVENTORS
Eugene L. Rolfs.
Charles W. Fuller.
ATTORNEY
D. N. Halstead.

Feb. 12, 1935.  E. L. ROLFS ET AL  1,990,711
PIPE WRAPPING APPARATUS
Filed April 4, 1929    9 Sheets-Sheet 3

INVENTORS
Eugene L. Rolfs.
Charles W. Fuller.
D. N. Halstead.
ATTORNEY

Feb. 12, 1935.  E. L. ROLFS ET AL  1,990,711
PIPE WRAPPING APPARATUS
Filed April 4, 1929  9 Sheets-Sheet 4
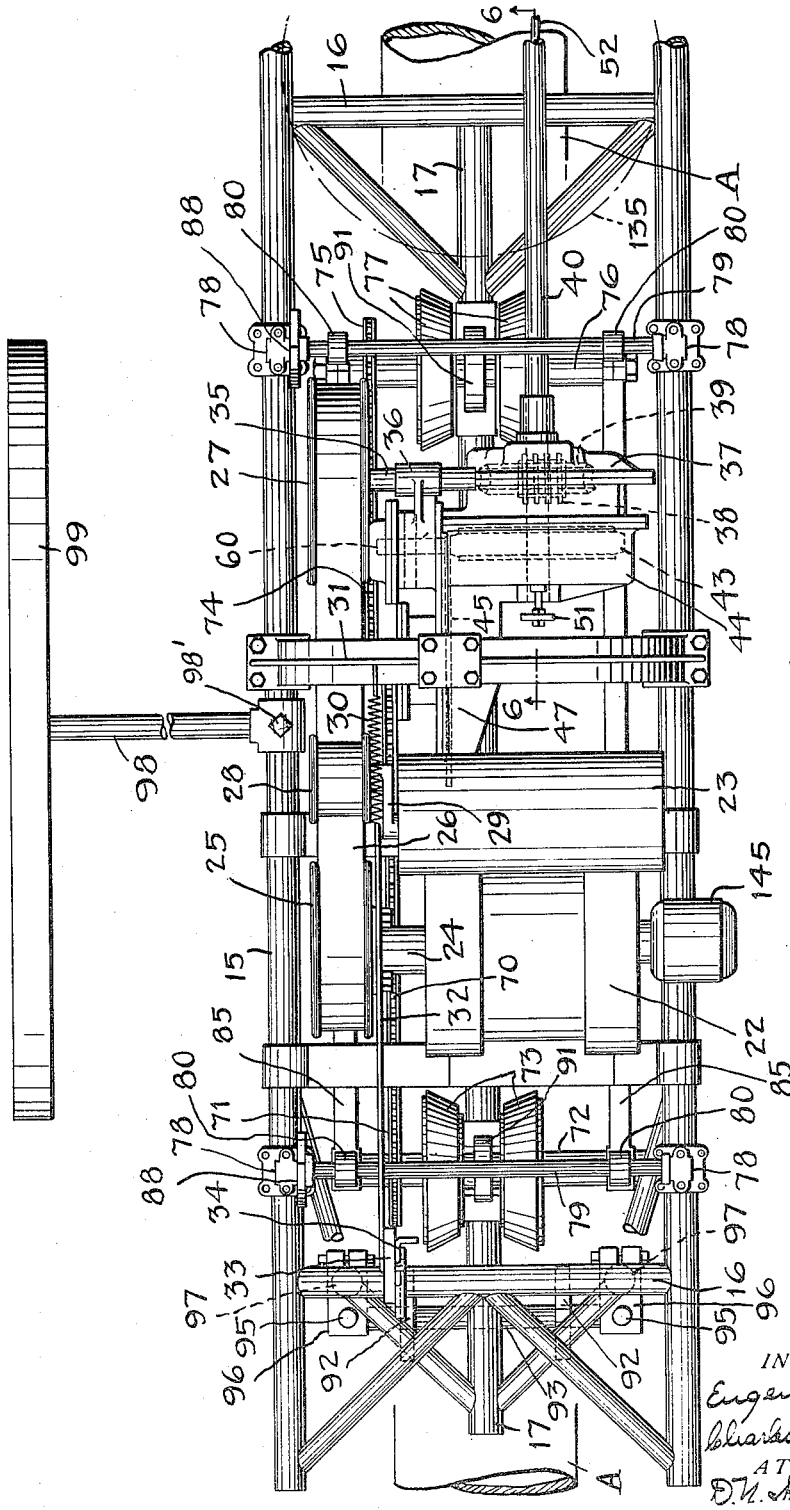
INVENTORS
Eugene L. Rolfs.
Charles W. Fuller.
ATTORNEY
D. N. Halstad

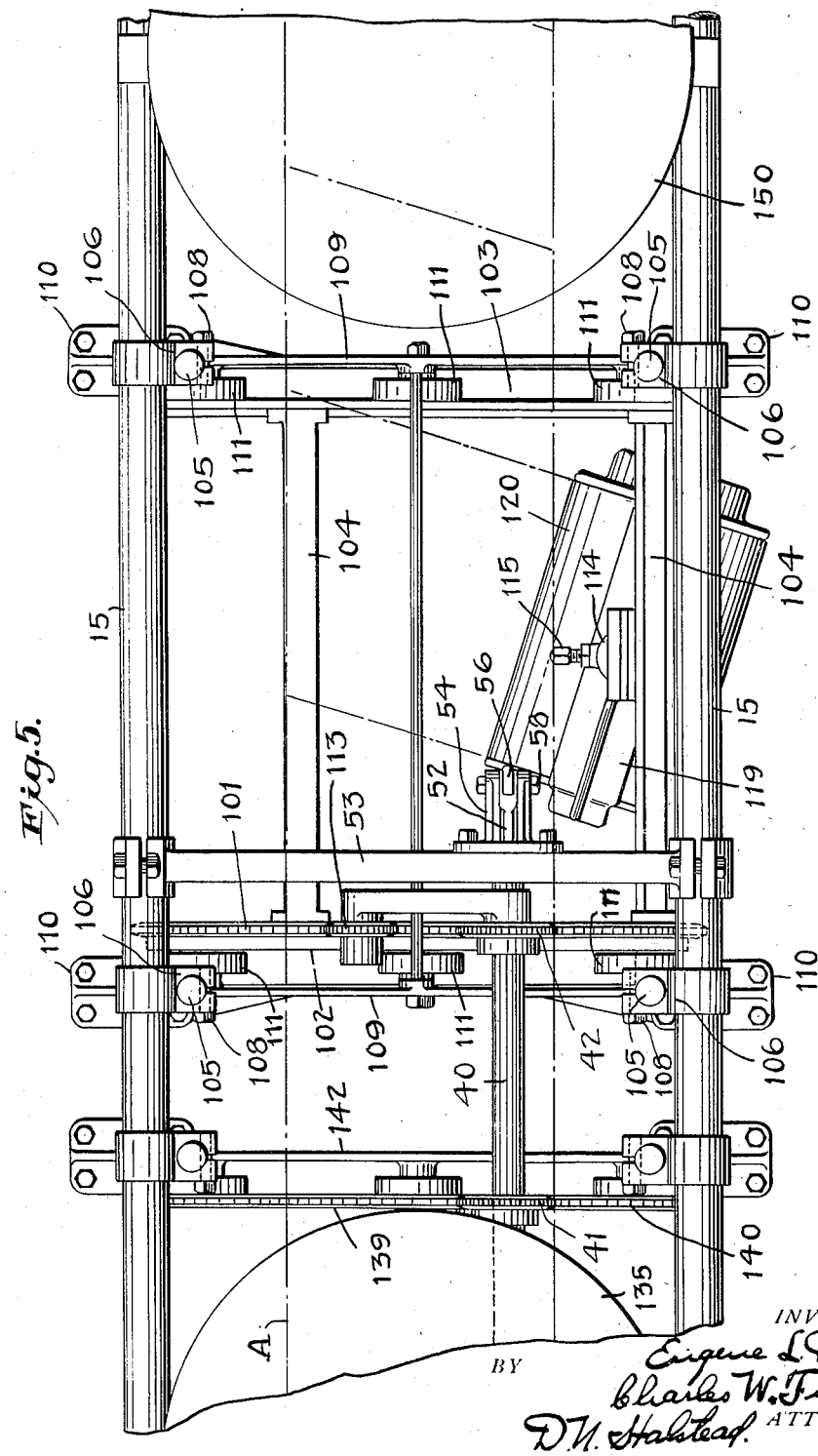

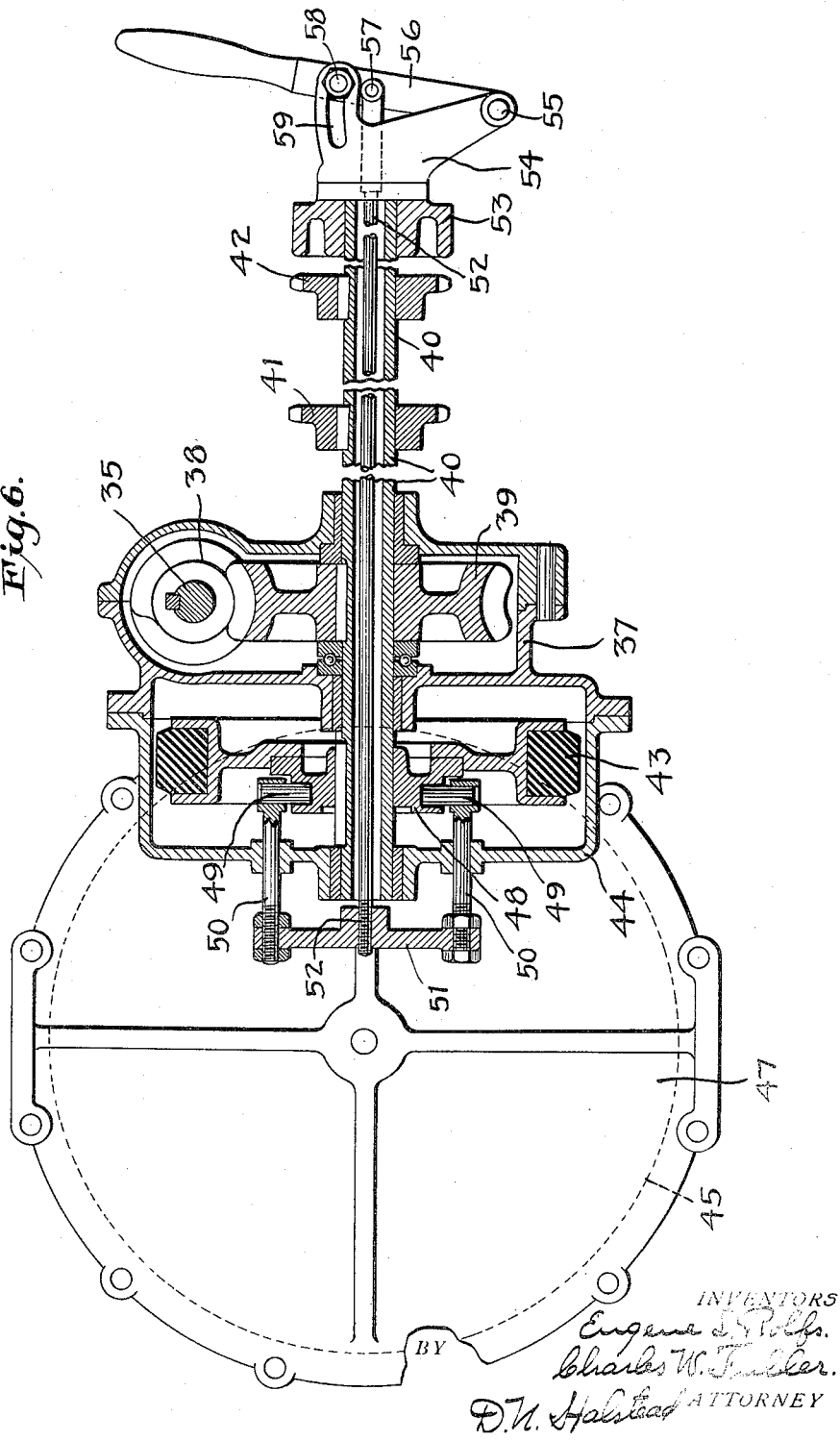

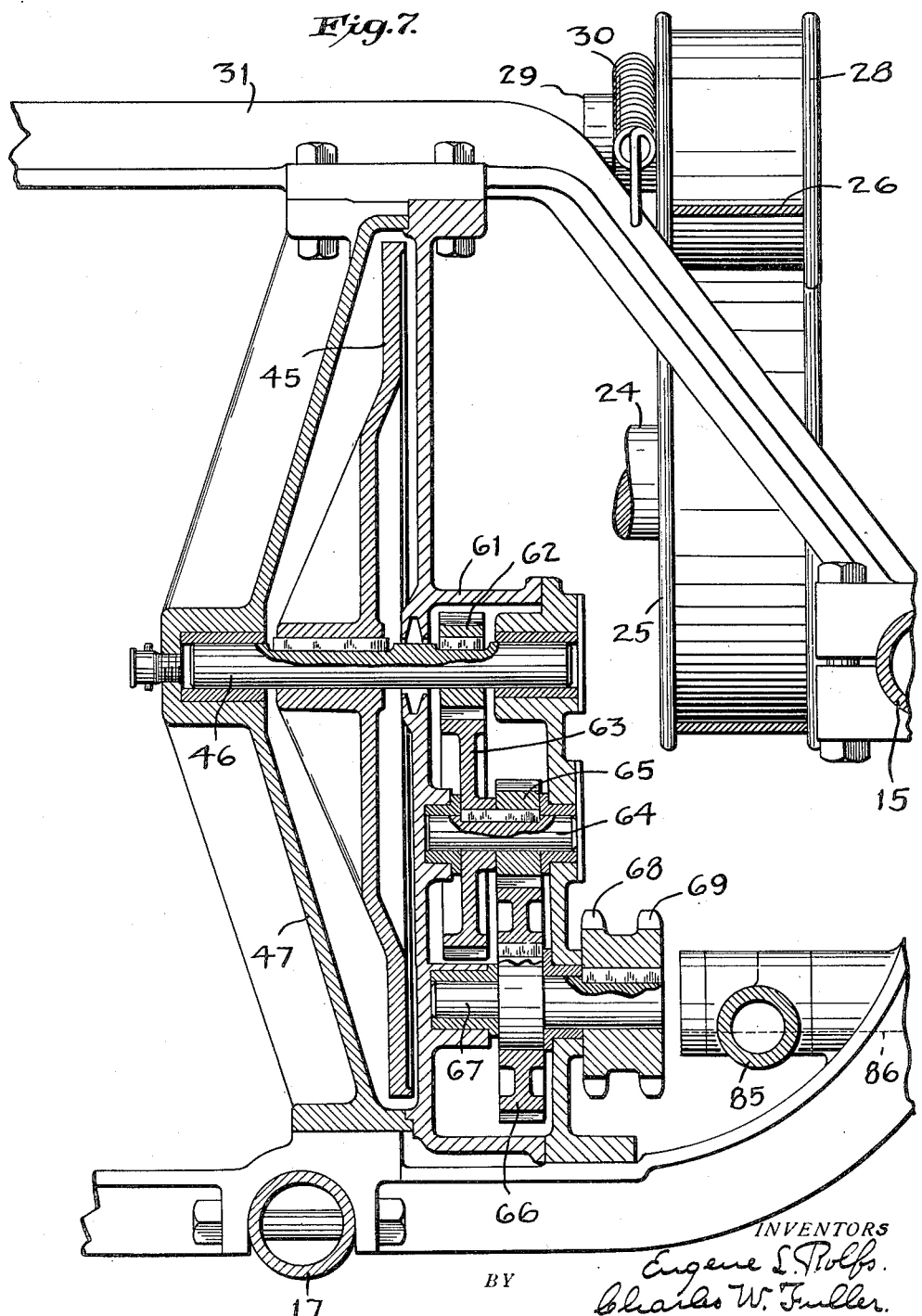

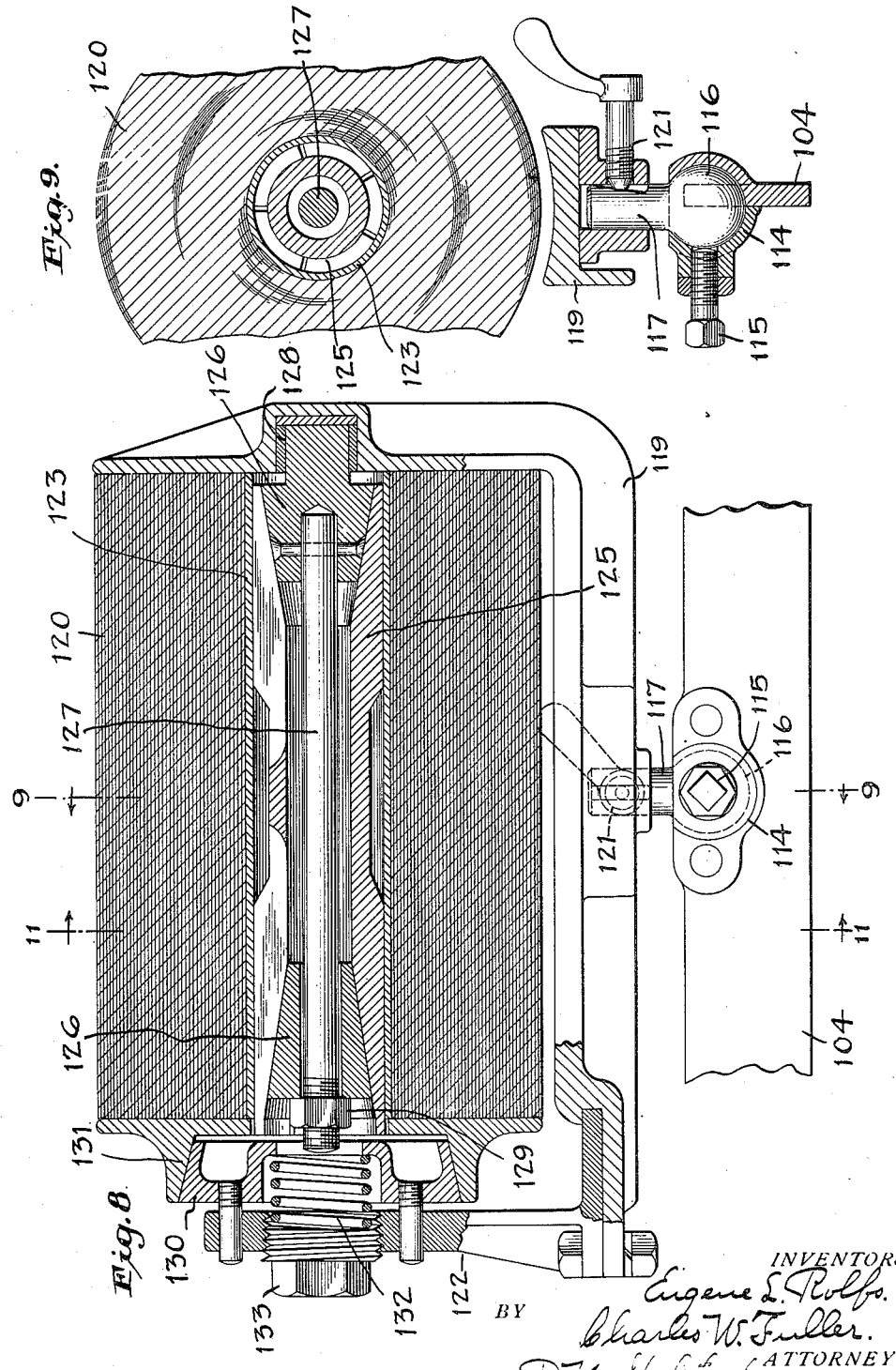

Feb. 12, 1935. E. L. ROLFS ET AL 1,990,711
PIPE WRAPPING APPARATUS
Filed April 4, 1929   9 Sheets-Sheet 9
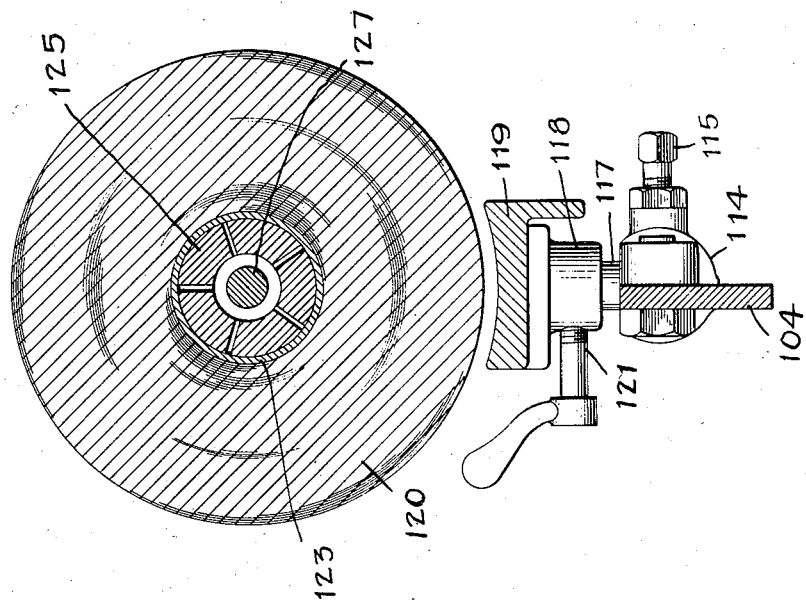
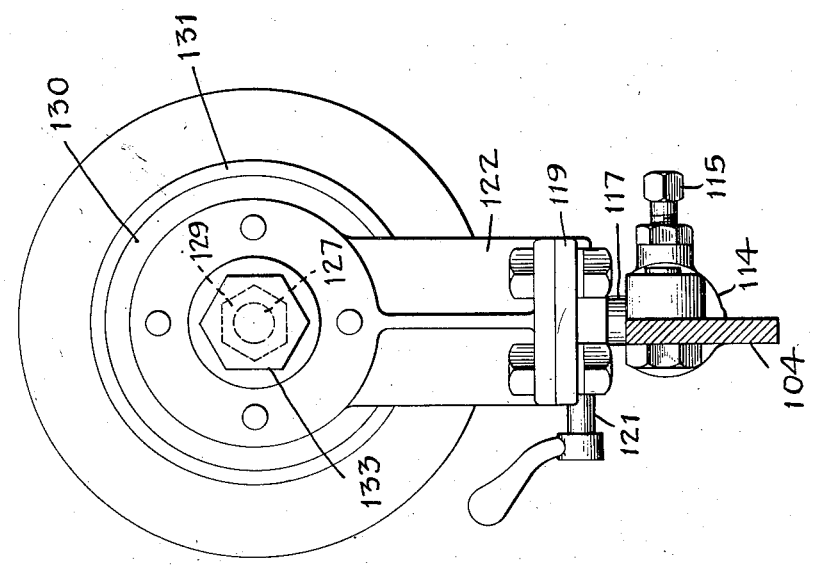
INVENTORS
Eugene L. Rolfs.
BY Charles W. Fuller.
D. H. Halstead.
ATTORNEY Patented Feb. 12, 1935

1,990,711

UNITED STATES PATENT OFFICE 1,990,711

PIPE WRAPPING APPARATUS

Eugene L. Rolfs, Dallas, and Charles W. Fuller, Houston, Tex., assignors, by direct and mesne assignments, to Johns-Manville Corporation, New York, N. Y., a corporation of New York Application April 4, 1929, Serial No. 352,451

8 Claims. (Cl. 242—11)

The invention relates to a pipe-wrapping machine, and particularly to that type of machine which is adapted to travel on the pipe while it is in position preparatory to being laid in the trench; or if desired, after the trench has been sufficiently cleared, the pipe may be wrapped or covered without disturbing it.

The machine for automatically or mechanically wrapping the pipe is so constructed as to travel along the pipe using the pipe as a track or support for the operating mechanism and the wrapping mechanism actuated thereby.

The machine also contemplates means for spreading a coating of bitumen or other suitable asphaltic material on the pipe prior to its being wrapped and after the wrapping has been applied thereto.

One of the important objects of the machine is to provide means whereby it may be readily adjusted so as to adapt it for use on pipe of different diameters.

Another object is to provide a simple means whereby the speed ratio between the wrapping means and the propelling means may be easily and quickly varied. This feature is particularly useful when different widths of wrapping are used or where it is desirable to vary the amount of overlap or on different pipe diameters.

Another object is to provide means whereby the machine may readily pass over irregularities in the pipe line, such as fittings or couplings, without disturbing the equilibrium of the machine and thus prevent the wrapping from becoming torn or distorted under these conditions.

A further object is to provide a machine in which the mechanism is simple and compact, so that a substantially light portable apparatus is obtained.

Numerous other advantages will become apparent as the specification proceeds. Referring to the drawings forming a part thereof and in which a preferred embodiment of the device is illustrated:

Fig. 4 is a top plan view of the parts shown in Fig. 3;

Fig. 5 is a top plan view of the end of the machine carrying the wrapping mechanism;

Fig. 6 is a fragmentary detail sectional view taken on the line 6—6 of Fig. 4 with intermediate parts being broken out for economy of space;

Fig. 7 is a fragmentary detail sectional view taken on line 7—7 of Fig. 3;

Fig. 8 is a longitudinal sectional view, with parts in elevation, of the reel for the wrapping material and its associated parts;

Fig. 9 is a cross sectional view on line 9—9 of Fig. 8;

Fig. 10 is an end elevation looking from the left of Fig. 8; and

Fig. 11 is a cross sectional view taken on line 11—11 of Fig. 8.

Figure 3:
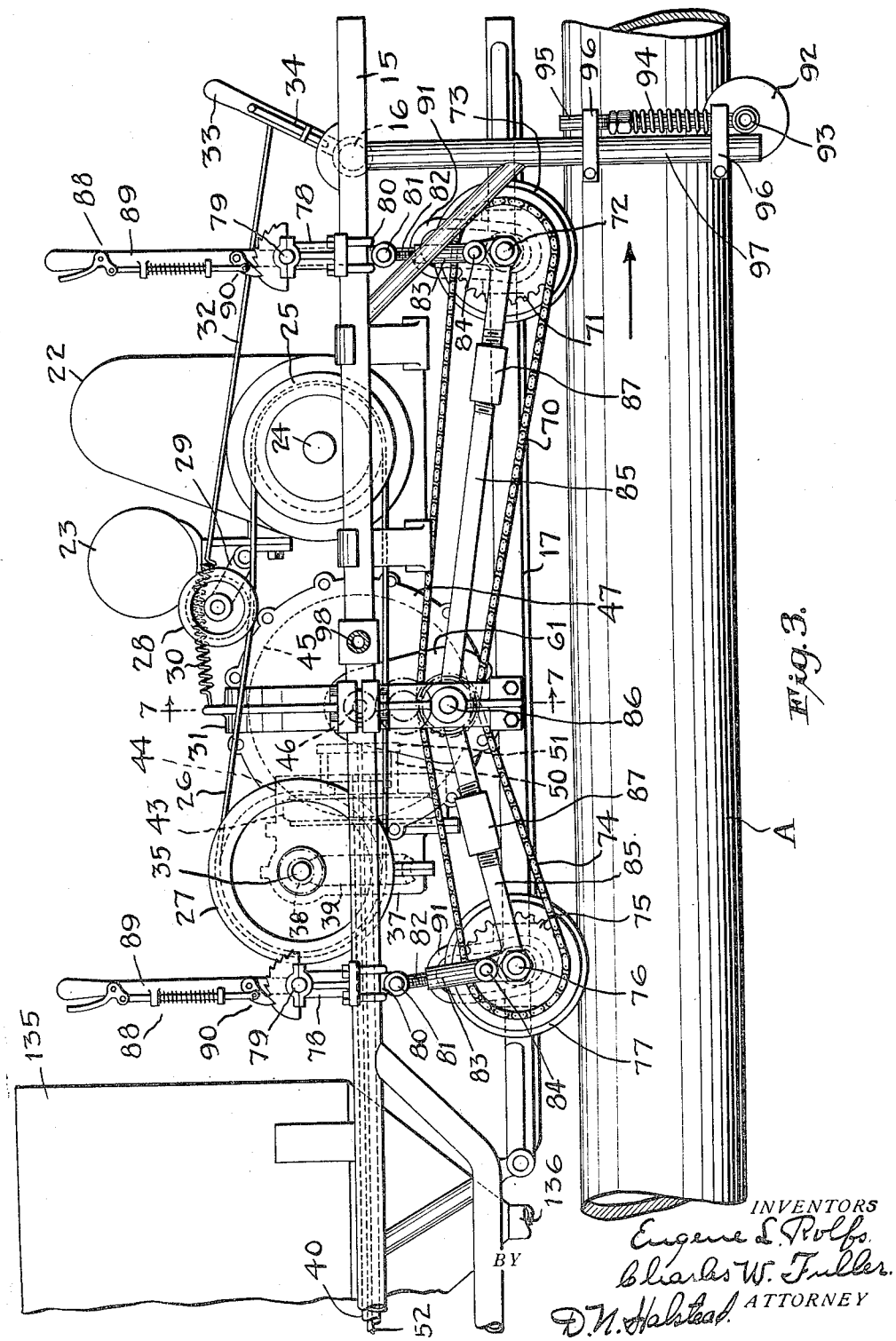
Fig. 3 is a side elevation looking from the opposite side of Fig. 1 and illustrating particularly the motor and propelling or driving mechanism.

Referring again to the drawings, the machine is supported on a frame comprising longitudinal side members 15, transverse members 16 and a central longitudinal member 17, as seen in Fig. 3. A tubular framework has been illustrated, but obviously the frame might be of structural steel of suitable design.

Mounted on the forward part of this frame at 18 is the motor and propelling mechanism. Located on the frame adjacent the propelling mechanism is the hopper and its associated parts 19 for distributing the bitumen or asphaltic material on the pipe prior to its being wrapped. In the rear of this hopper and its associated parts is the wrapping mechanism indicated at 20, and on the rear end of the frame at 21 is located the means for coating the wrapped pipe with a suitable asphaltic material.

The driving or propelling mechanism will first be described. The motor 22 is suitably supported on the frame and, as illustrated in Fig. 3, is a light internal combustion type having a gas tank 23 located slightly to the rear thereof. Any other suitable motive power might be employed. Secured to the crank shaft 24 of the motor is a pulley 25 which through the medium of a belt 26 drives a larger diameter pulley 27. An idler pulley 28 is arranged to depress the belt 26 in such a manner as to act as a clutch, tightening the belt against the drive pulley and the driven pulley.

The idler pulley 28 is carried on a pivoted arm 29. A spring 30 bears against a hub on the arm 29 adjacent the pulley. One end of this spring is secured to a yoke 31 and the other end is secured to a rod 32, the other end of the rod 32 being fast to an operating lever 33. The operating lever 33 is pivoted on one of the transverse members 16 and suitable means indicated at 34 (Fig. 3), are provided to hold the operating lever in a position where the spring 30 is tautened so as to press the idler pulley 28 against the belt. In starting the motor, the operating lever 33 is released, and when it is desired to operate the machine the lever is moved to the position shown in Figs. 1 and 2. Any time it is desired to stop the machine without cutting off the fuel supply and stopping the motor, the operating lever may be released.

The pulley 27 is mounted on a shaft 35 which has a bearing 36 and enters a housing 37. Within the housing 37 and keyed to the shaft 35 is a worm 38 which engages a worm wheel 39 secured to a longitudinally extending hollow shaft 40.

The hollow shaft 40 extends toward the rear end of the machine and has sprockets 41 and 42 secured thereto (see Fig. 5). The sprocket 41 drives the mechanism for applying the bitumen to the pipe prior to its being wrapped, and the sprocket 42 drives the wrapping mechanism. Both of these mechanisms will be described in detail hereinafter. It will be apparent from the foregoing that the shaft 40 being directly driven by the pulleys 25, 27, belt 26, worm 38 and worm wheel 39 will be rotated at a fixed speed commensurate with the speed of the motor.

It is desirable for reasons heretofore mentioned to vary the speed ratio between the wrapping mechanism and the propelling mechanism. For this purpose a friction wheel, as indicated at 43, Figs. 4 and 6, is slidably mounted or splined to the hollow shaft 40. This friction wheel is enclosed by a housing 44 to which the housing 37 is secured or made integral therewith. The friction wheel 43 engages the surface of a large friction disc 45 which is keyed or otherwise secured to a stub shaft 46. The friction disc 45 has its housing 47 which is suitably secured to the yoke 31. Housing 44 is secured to or made integral with housing 47 for the friction disc.

The friction disc through suitable mechanism hereinafter described drives the traction wheels which propel the machine along the pipe. Means are provided to move the friction wheel 43 toward or away from the center of the friction disc 45 so as to vary the speed at which the disc is rotated.

It will be apparent that the friction wheel 43 moving at a fixed rate of speed will cause the disc 45 to revolve more rapidly as the wheel is moved toward the center of the disc. The friction wheel 43 is provided with a grooved hub 48 (see Fig. 6) which is engaged by pins 49 mounted on the ends of slidable rods 50 which extend outwardly through the housing 44. These rods 50 are secured to a cross member 51. A shaft or pull rod 52 is secured to the cross piece 51 and extends through the hollow shaft 40. The rear end of the hollow shaft 40 has a bearing in a cross member 53 secured to the longitudinal frame members 15. Secured to this cross member 53 is a bracket 54 on which is pivoted at 55 a lever 56. Pivoted on the lever 56 at 57 is the end of the pull rod 52. From an inspection of the drawings and the foregoing description, it will be clear that manipulation of the lever 56 will move the friction wheel 43 toward or away from the center of the friction disc 45 and thus vary the speed of the disc.

A bolt 58 on lever 56 may be tightened in the arcuate slot 59 in bracket 54 to hold lever 56 in the desired position. An idler wheel or roller 60, see Fig. 4, bears against disc 45 on the side opposite friction wheel 43 so as to insure a better driving contact, take up strains and prevent the disc 45 from being forced out of alignment.

Mounted in a housing 61 (see Fig. 7) adjacent housing 47 is a chain of reduction gears. Keyed to stud shaft 46 is a pinion 62 which meshes with a gear 63 secured to a stub shaft 64. Adjacent gear 63 and also secured to stub shaft 64 is pinion 65 which engages a gear 66 fast to a stub shaft 67. The stub shaft 67 extends beyond the housing 47 and has secured to it sprockets 68 and 69.

Sprocket chain 70, as will be seen in Fig. 3, connects the sprocket 68 with sprocket 71 which is secured to axle 72 on which the front traction wheels 73 are mounted. A similar chain 74 connects sprocket 69 with sprocket 75, which in turn is secured to axle 76 on which the rear pair of traction wheels 77 is mounted. The traction wheels 73 and 77 are so shaped that their peripheries substantially conform to the contour of the pipe A. From the foregoing, it will be apparent that the speed of rotation of the motor shaft is reduced repeatedly in its transmission to the shafts of the traction wheels. The frame is therefore propelled along the pipe A at a moderately slow rate of speed and the speed ratio between propelling means and wrapping mechanism may be easily and quickly varied. By slowing up the forward speed of the machine in relation to the wrapping mechanism, a greater overlap is secured. When the width of the strip to be wrapped around the pipe is changed, it is also desirable to change the speed ratio as is the case when the machine is used on a larger or smaller diameter pipe.

The traction wheels are so mounted that they may be adjusted in relation to the frame so as to vary the distance between the frame and the center line of the pipe when different diameter pipes are to be covered. The traction wheels are also arranged so that they may be quickly raised toward the frame or away from the pipe so that in passing over irregularities in the pipe line, such as bulky couplings or fittings, the equilibrium of the machine will not be disturbed. When the machine is going forward or in the direction of the arrow indicated in Fig. 3, as a coupling is approached the front wheels 73 are raised. As the coupling is passed, these wheels are lowered and the rear wheels 77 are raised. After the rear wheels have passed the coupling they are lowered. It would not be necessary to raise the wheels in passing over slight irregularities or shallow fittings.

The means for positioning the traction wheels being similar on both front and rear wheels, one will be described and similar reference numerals applied to each. Referring to Figs. 3 and 4, brackets 78 are secured to the side frame members 15. Mounted in bearings on the upper parts of these brackets is a cross shaft 79 to which depending arms 80 are secured. Pivoted at 81 on the lower ends of these arms 80 are threaded members 82. The threaded members 82 engage threaded sleeves 83 which are pivoted above the axles at 84 to arms 85. The threaded members 80 and sleeves 83 provide the means for changing the distance between the center line of the pipe and the machine when pipes of different diameters are to be covered.

The arms 85 are pivoted at 86 to the transverse yoke 31 which is secured to the longitudinal frame members. The arms 85 are adjustable as to their length by means indicated at 87, so that when the traction wheels are raised or lowered for different diameters of pipe, the arms 85 may be accordingly shortened or lengthened. Means indicated at 88 are provided for holding the wheels in their desired position and for raising and lowering them when desired for purposes heretofore explained. This means might be widely varied, and as illustrated, comprises levers 88 secured to the cross shafts 79. A well known pawl and ratchet mechanism 90 holds the levers 88 and thereby the cross shafts 79 and traction wheels in any desired position. Arcuate guides 91 secured to the central longitudinal frame member 17 maintain the traction wheels in their proper relation when they are being moved.

Forwardly of the traction wheels 73 are a pair of wheels 92 adapted to engage below the pipe. These wheels are mounted upon a shaft 93 resiliently held against the lower side of the pipe by springs 94 mounted upon rods 95 extending upwardly through yokes or guides 96 secured to the downward extensions 97 of the frame. It will be noted that the wheels 92 engage the pipe on the under side in such a manner as to assist in preventing a rotation of the frame on the pipe and to maintain the traction wheels in contact with the pipe.

Figure 1:
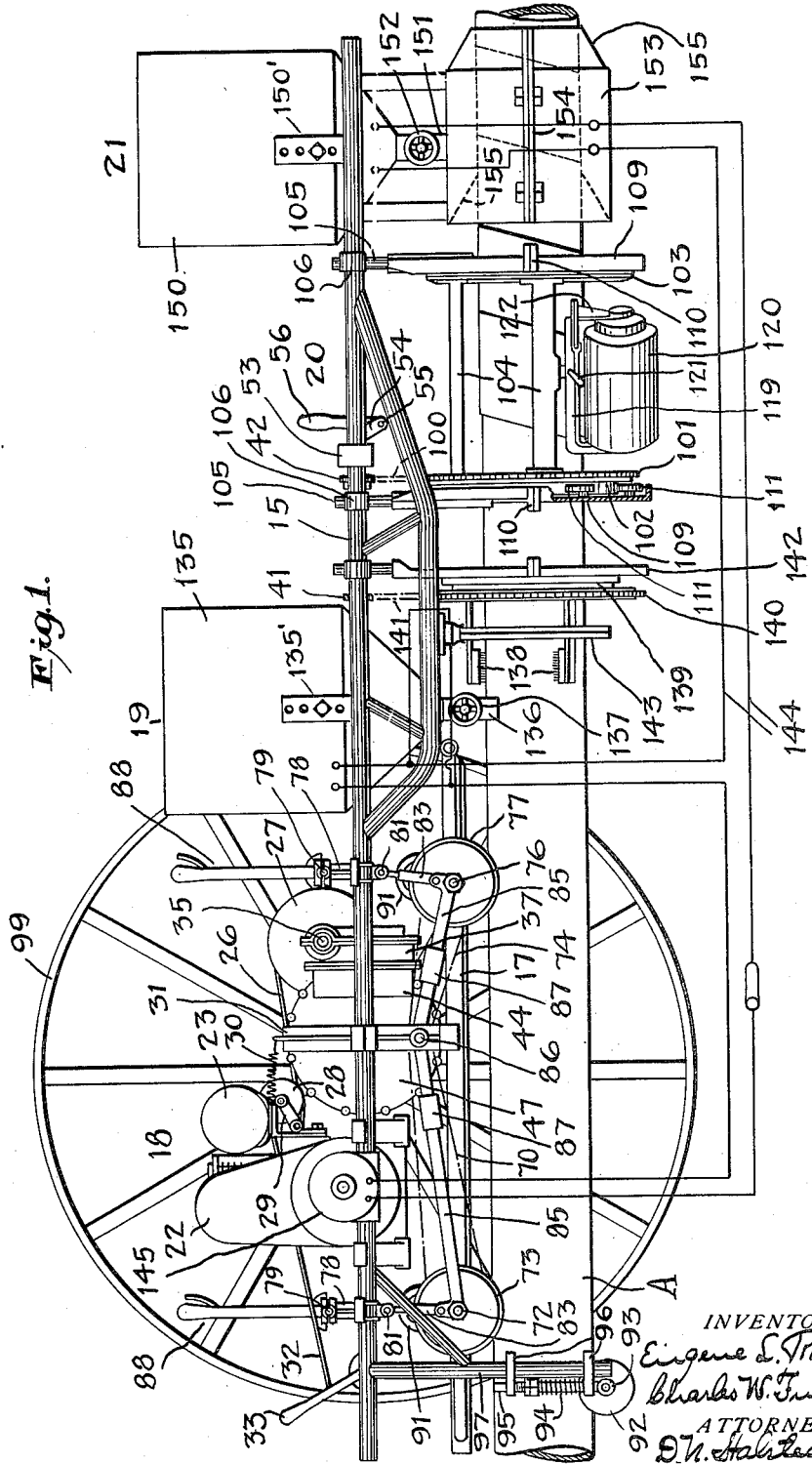
Fig. 1 is a side elevation, the wiring from the electric generator for supplying heat to the bitumen spreading devices being shown diagrammatically.

To further prevent rotation of the frame relative to the pipe and to act as a stabilizer, Figs 1 and 4, a laterally extending leg or axle 98 is adjustably secured by means of set screw 98' to one of the frame members 15, and has on its outer end a wheel 99 adapted to travel on the ground or track alongside of the machine.

Figure 2:
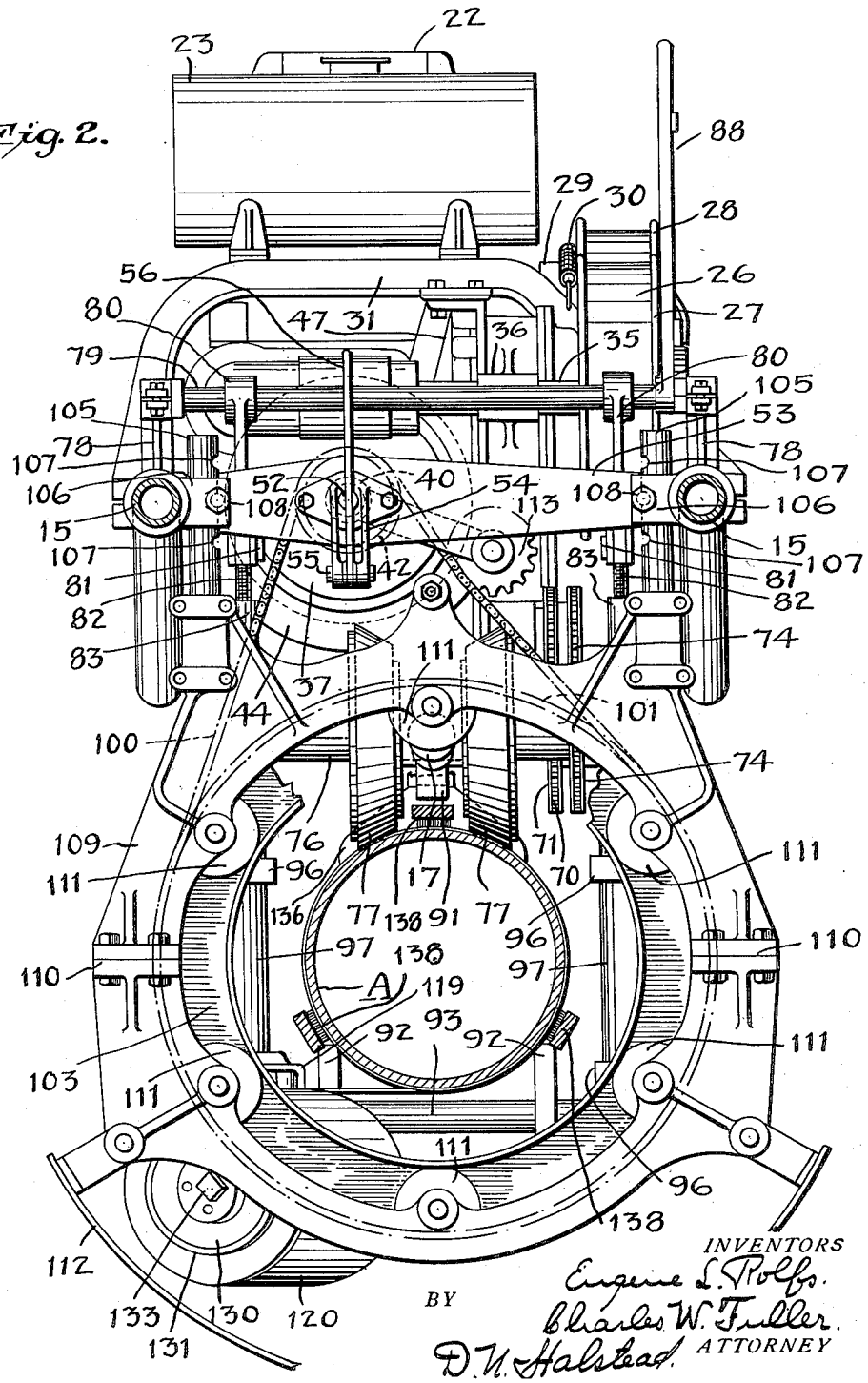
Fig. 2 is an end elevation looking from the right of Fig. 1. In this view the storage tank or hopper and spreading means for applying the bitumen to the wrapped pipe is omitted for clearness of illustration, and parts of the hopper and distributing means for applying the bitumen to the pipe prior to its being wrapped are broken away and in section for the same purpose.

The wrapping mechanism particularly illustrated in Figs. 2 and 5 will now be described. The drive sprocket 42 previously mentioned is connected by sprocket chain 100 with a sprocket 101 secured to one of the end ring-shaped members 102 of a skeleton drum. The skeleton drum which surrounds the pipe is composed of the ring-shaped member 102, another ring-shaped member 103 and connecting cross pieces 104. The sprocket and rings are split for the purpose of installing and removing from a pipe line.

The skeleton drum is supported in a frame which surrounds the pipe A and is suspended from the longitudinal frame members 15. Posts 105 are carried by brackets 106 secured to the frame members 15. The posts 105 are provided with a plurality of notches 107, one of which is engaged by bolts 108 passing through the brackets 106. Thus, when an adjustment is made in the forward or driving mechanism of the machine for different diameter pipes, the position of the wrapping mechanism may be accordingly adjusted.

Secured to the lower parts of the posts 105 are the frame members 109. The frame members are split, as indicated at 110, so that the machine may be readily removed from or placed in position on the pipe. A plurality of rollers 111 are carried by the stationary frame members. The rollers engage flanges on the ring-shaped end members of the skeleton drum so as to provide a bearing for the free rotation of the drum. An apron 112 secured to the lower part of the frame members 109 will act as a guard for the wrapping mechanism. An idler sprocket 113 bearing on the sprocket chain 101 keeps the same tight in different positions of the wrapping mechanism.

Mounted on one of the cross members 104 of the skeleton drum is a reel of wrapping material. This reel and its associated parts are particularly illustrated in Figs. 8 to 11. A ball socket 114 is formed in one or more of the cross members 104. Mounted in this socket and held in proper position by set screw 115 is a ball 116 having a stem 117. The ball and socket connection allows the reel, hereinafter described, to be rotated so as to position it at the proper angle relative to the pipe which is to be wrapped.

The stem 117 cooperates with a socket 118 secured to the frame 119 for supporting the roll of wrapping material 120. A notch in the stem 117 is engaged by a set screw 121 to prevent rotation of the frame 119 and provide a means of ready detachment when it is desired to place a new roll of wrapping material in place.

The frame 119 is U-shaped and one leg 122 may be removed for replenishing the roll of wrapping material. The reel or spool 123 upon which the material is wound is made up of a cylinder of cardboard or other destructible material, and this cylinder is engaged by an internal expanding chuck 125. The chuck is expanded by a pair of cone-shaped members 126, one of which is secured to a spindle 127 and the other being free to move in relation to the spindle. The cone-shaped member secured to the spindle has a bearing 128 in the frame 119. The members 126 are forced together by a nut 129 on the end of the spindle, and the chuck is caused to expand and firmly grip the roll of wrapping material.

Slidably mounted in the removable end 122 of the frame is a clutch member 130. This clutch member 130 forms the female part of what might be termed a brake and engages the male member 131. A spring 132 forces the members 130 and 131 into engagement. The tension of the spring may be regulated by the nut 133. In this manner a reel is provided which may be carefully adjusted so that the material will not unroll too freely or will not bind so as to possibly tear it. The drum has been disclosed as carrying only one spool; however, the same may carry several spools of wrapping material, which may be wrapped on the pipe one after another or all at the same time, thereby laying a covering of several thicknesses.

In the operation of this device the frame together with the supporting mechanism is propelled along the pipe in the manner described through the contact of the friction wheels 73 and 77 against the pipe itself. The speed of travel of the frame along the pipe may be varied through the adjustment of the friction wheel 43 relative to the larger disc 45 and this may be readily accomplished as the machine is operating through the movement of the control lever 56, as previously noted. This will enable the operator to arrange the speed of travel to accord with the unreeling of the wrapping material from the roll. The roll of material is arranged at an angle relative to the pipe and as the frame upon which the roll is mounted is rotated about the pipe, the frame is moved along the pipe so as to wrap the material thereon. After the roll has been adjusted as accurately as possible in the manner previously described, the speed of travel may then be more accurately adjusted through the movement of the friction drive gears in the manner noted. The brake 130—131 upon the roll of wrapping material may be adjusted to place the proper tension upon the material as it is being wrapped so that a smooth, even layer may result.

It is desirable in wrapping the pipe to cover the same prior to its being wrapped with a coating of bitumen or suitable asphaltic material, and also to apply a coating of similar material to the pipe after being wrapped. The mechanism for applying this coating to the pipe prior to its being wrapped will now be described.

A tank or hopper 135 for holding a supply of hot bitumen is adjustably secured to the frame at 135'. An outlet 136 controlled by a valve 137 is provided for allowing the hot bitumen to run onto the pipe. Adjacent this outlet are a plurality of distributing brushes 138 secured to a rotating member 139. This rotating member 139 has a sprocket 140 secured to it, and a sprocket chain 141 engages sprocket 140 and sprocket 41 on the hollow drum shaft 40. The rotating member 139 is mounted in a frame member 142 secured to the longitudinal main frame members 15 in a similar manner as the frames 109 of the wrapping mechanism.

The brushes 138 having resistance coils are electrically connected by means of slip ring 143 and wiring 144 to a generator 145 driven by the motor 22. In this manner the brushes may be heated to insure a proper distribution of the coating. The wiring 144 also leads to resistance coils in the storage hoppers 135 and 150. As shown, the take-offs from the feed lines 144 are in series and with this form only one cut-off switch is used. However, the take-offs may be in parallel, and with this form each of the take-offs has switches, as well as the main line. Any other means may be utilized for providing heat to the brushes and tanks to prevent the bitumen from hardening.

The means for applying the hot bitumen to the covered pipe will now be described. The storage tank 150 for hot bitumen is adjustably mounted on the main frame at 150', and has an outlet 151 controlled by a valve 152. The outlet 151 leads to a spreader 153 which is carried by the main frame and is adapted to slide along the pipe. The spreader is preferably split, as indicated at 154. In the forward and rearward ends of the spreader are mounted flexible brushes or wipers 155 which evenly spread the hot bitumen on the wrapped pipe. The wiring 144 from generator 145 also leads to resistance coils in this bitumen-applying device to provide heat.

It is desired to call attention at this time to the fact that either of the bitumen spreaders may be substituted for the other or the same type of either style may be utilized for spreading the bitumen on the pipe preparatory to being wrapped and after being wrapped.

A detailed description of the operation has been entered into as the specification progressed, it is thought to suffice.

While the machine is primarily adapted to travel along the pipe, it will be evident that very little change will be necessary to provide a device in which the pipe will be moved by the traction wheels and the machine be held stationary upon a supporting means.

A preferred embodiment of the apparatus has been illustrated and described, but many changes may be made in arrangements of parts and details of construction without departing from the spirit of the invention or the scope of the appended claims.

What we claim is:

1. A pipe-wrapping device including a main supporting frame and a sub-frame adapted to surround the pipe, means to adjust said sub-frame on the main frame, a drum rotatable in said sub-frame, a spool of wrapping material thereon, means to rotate said drum to move said spool around the pipe and wind said material thereon, and traction means engaging said pipe to move said device along said pipe as said drum is rotated.

2. A pipe-wrapping machine comprising a frame, traction wheels mounted thereon adapted to engage a pipe and support said frame, a drum on said frame rotatable about said pipe, a spool of wrapping material carried by said drum, means for rotating said traction wheels so as to propel said frame along said pipe, means for rotating said drum about said pipe so as to cause said wrapping material to be wrapped around said pipe, and means whereby said traction wheels may be raised and lowered so as to maintain the equilibrium of said machine in passing over irregularities in the pipe to be covered.

3. A pipe-wrapping machine comprising a frame, traction wheels mounted thereon adapted to engage a pipe and support said frame, a drum on said frame rotatable about said pipe, a spool of wrapping material carried by said drum, means for rotating said traction wheels so as to propel said frame along said pipe, means for rotating said drum about said pipe so as to cause said wrapping material to be wrapped around said pipe, and means for adjusting the distance between said frame and the center line of said pipe to be wrapped so as to compensate for varying diameters of pipe.

4. A pipe-wrapping machine comprising a supporting frame, means movably supporting the frame on a pipe including traction wheels engaging the upper side of the pipe for progressively feeding the machine along the pipe, a wrapping drum mounted on said frame to rotate around the pipe, and means for raising and lowering said wheels relatively to the frame and drum.

5. Apparatus for treating pipe lines comprising a carriage, traction wheels supporting the carriage on the pipe for movement longitudinally thereof, a sub-frame surrounding the pipe approximately concentrically therewith, a transverse power shaft offset relatively to said wheels longitudinally of the pipe, kinematic connection between said shaft and wheels for driving the latter, bearings for said wheels, and means for adjustably supporting said bearings to swing about said shaft as an axis, whereby the wheels may be moved relatively to the carriage to center the sub-frame on the pipe without disturbing said kinematic connection.

6. Apparatus of the character described including a frame, a plurality of supporting and propelling units adjustably mounted on the frame for independent movement toward and from a conduit under treatment, and means for selectively shifting the units from and to supporting engagement with the conduit to permit the units to alternately pass over obstructions on the conduit.

7. Apparatus of the character described including a frame, a plurality of rollers adjustably mounted on the frame for independent movement to and from supporting and propelling contact with a conduit under treatment, means for selectively shifting the rollers to permit the rollers to alternately pass over obstructions on the conduit, and means for actuating the rollers to propel the apparatus along the conduit.

8. Apparatus of the character described including a frame, a plurality of individual supporting units arranged in train on the frame, each including a roller adapted for frictional contact with a conduit being treated, means for actuating the rollers to propel the frame along the conduit, and means for selectively shifting the units to alternately space the rollers from the conduit.

EUGENE L. ROLFS.
CHARLES W. FULLER.